United States Patent [19]

Harner et al.

[11] 4,263,781

[45] Apr. 28, 1981

[54] INTEGRAL ROCKET-RAMJET OPEN LOOP FUEL CONTROL SYSTEM

[75] Inventors: Kermit I. Harner, Windsor; John P. Patrick, South Windsor, both of Conn.

[73] Assignee: United Technologies Corporation, Hartford, Conn.

[21] Appl. No.: 60,443

[22] Filed: Jul. 25, 1979

[51] Int. Cl.$^3$ .............................................. F02K 9/06
[52] U.S. Cl. ........................................ 60/243; 60/245; 60/250; 60/270 R
[58] Field of Search .............. 60/245, 250, 243, 270 R

[56] References Cited

U.S. PATENT DOCUMENTS

| | | | |
|---|---|---|---|
| 2,729,061 | 1/1956 | Grafinger | 60/39.28 R |
| 2,792,685 | 5/1957 | Constatino et al. | 60/39.28 R |
| 3,030,767 | 4/1962 | Bauer et al. | 60/270 R |
| 3,030,772 | 4/1962 | Drake | 60/39.28 R |
| 3,080,708 | 3/1963 | Carr | 60/39.28 R |
| 3,092,960 | 6/1963 | Worley et al. | 60/39.28 R |
| 3,218,801 | 11/1965 | Vasu | 60/243 |
| 3,482,396 | 12/1969 | Nelson et al. | 60/39.28 R |
| 3,791,141 | 2/1974 | Bush et al. | 60/243 |

OTHER PUBLICATIONS

Harner et al., "Control Systems Requirements for Advanced Ramjet Engines", AIAA Conf., Las Vegas, Jul. 25-27, 1978.

*Primary Examiner*—Robert E. Garrett
*Attorney, Agent, or Firm*—John D. Del Ponti; John Swiatocha

[57] ABSTRACT

In an integral rocket-ramjet having a combustor which initially serves as a rocket combustion chamber for booster propellant, and after the booster propellant is expended, serves as a ramjet combustor where fuel and air are burned, a fuel control system is described for the ramjet stage by which ram burner light-off is automatically initiated upon transition from rocket to ramjet propulsion. The fuel control regulates fuel flow to the combustor over the entire flight regime and responds to operating conditions to provide a light-off schedule, to stabilize the shock wave in the air inlet, to provide a maximum fuel-to-air ratio limit, to limit the maximum vehicle Mach number, and to prevent lean burner blowout by providing a minimum fuel-to-air ratio limit. Mach number limiting is performed in closed loop fashion, while the other functions are scheduled or open loop controls. Fuel flow to combustion chamber pressure ratio is used to provide fuel-to-air ratio limits, actual combustion chamber pressure being measured to provide the desired fuel flow signal.

8 Claims, 3 Drawing Figures

INTEGRAL ROCKET-RAMJET OPEN LOOP FUEL CONTROL SYSTEM

The Government has rights in this invention pursuant to Contract No. F33615-74-C-2059 awarded by the Department of the Air Force

BACKGROUND OF THE INVENTION

1. Field of the Invention

This invention relates to a fuel control system for integral rocket-ramjets which is automatically actuated upon transition from rocket to ramjet propulsion and which provides the limiting functions necessary to prevent the engine, air inlet and vehicle from operating in unacceptable regions. The fuel control modulates thrust by controlling fuel flow to perform the functions of ramjet light-off, inlet margin limiting, maximum fuel-to-air ratio limiting, vehicle velocity or Mach number limiting, and lean blowout limiting.

2. Description of the Prior Art

The concept of ramjet propulsion for vehicles was initiated in the early 1900's, and practical development evolved in the 1940's. Since then numerous advances have been made in this technology, and applications to advanced missiles is predicted for the future.

Rockets have been known for many centuries and led to practical applications during World War II and thereafter, with both solid fueled and liquid fueled rockets used for space exploration.

The marriage of the ramjet and rocket took place during the 1960's when the integral rocket-ramjet (IRR) was developed for missile applications. In 1967 the low altitude short-range missile LASRM was developed. The basic IRR is a combined propulsion system. Ramjet fuel is sealed off from the rocket fuel so that the IRR starts out as a pure rocket engine using rocket fuel in the ramjet combustion chamber, and a rocket nozzle inside the ramjet nozzle. During the rocket boost, the ramjet air inlets are typically covered with blow-off fairings and the air openings to the combustion chamber are sealed off with blow-off plugs. When the rocket fuel burns out, the blow-off fairings, inlet plugs and rocket nozzle are ejected, leaving a ramjet propulsion system which is then ignited. Numerous configurations of IRR's have been developed, and this invention is applicable to any IRR in which a liquid fuel is fed to the ramjet combustion chamber and ignited upon termination of the rocket phase.

The basic ramjet consists of a supersonic air inlet, a combustor, a fuel supply system and an exhaust nozzle. The supersonic air inlet admits air to the engine, reduces the air velocity, and interfaces with the combustor which develops combustor pressure. The combustor adds heat and mass to the air by burning the fuel, and thereby increases combustor pressure. The nozzle converts combustion chamber pressure tod kinetic energy to produce thrust.

The fuel to the ramjet is supplied from a storage tank by pumping or pressurization. A fuel control modulates fuel flow to prevent the engine, inlet and vehicle from operating in unacceptable regions. The fuel control must permit thrust modulation over as large a range as is practical without exceeding the operating constraints to optimize vehicle performance. The fuel control matches fuel flow with airflow to maintain the fuel-to-air ratio within limiting values for both lean and rich mixtures. Operation is closely inter-related with conditions in both inlet and combustor. The fuel control also must maintain an appropriate initial flow of fuel during transition from rocket to ramjet operation, control inlet pressure margin, and limit flight Mach number. A ramjet fuel control may be considered an air inlet control in that it positions the shock wave at a desirable location in the ramjet inlet and meters fuel as required to maintain that shock position for the inlet limiting portion of the flight envelope.

Numerous fuel controls fo ramjets are known in the prior art, most of which have disadvantages such as inability to provide proper fuel flow over the large range of operating conditions encountered during high performance ramjet operation. More specifically, prior art ramjet fuel controls did not take into account the effect of the shock wave produced at the air inlet and thus often encountered operating conditions where vehicle performance deteriorated.

The present invention improves high performance ramjet operation by scheduling fuel via a novel fuel control system which prevents the engine, inlet and vehicle from operating in inefficient or unacceptable regions, and provides thrust modulation over a wide range of operating conditions. The control is adaptable to a wide variety of vehicle configurations, and has the advantages of low cost, high reliability and low weight and volume. The basic control parameters are derived using electronic devices, and are adapted to digital implementation, while the actual fuel metering is performed by proven hydromechanical controls.

It is therefore an object of this invention to provide a ramjet fuel control which meters fuel to the ramjet combustor to ensure safe ram burner light-off and transition from rocket to ramjet propulsion.

Another object of this invention is a ramjet fuel control which meters fuel to prevent the air inlet from operating in the unstable subcritical region via an open loop inlet margin control.

A further object of this invention is a ramjet fuel control which provides both maximum and minimum fuel-to-air ratio limits for optimizing operation and preventing lean burner blowout.

Another object of this invention is a ramjet fuel control which provides a closed loop maximum vehicle velocity or Mach number control by metering fuel flow.

SUMMARY OF THE INVENTION

In accordance with a preferred embodiment and the best operating mode of this invention, there is provided a ramjet fuel control system for an integral rocket-ramjet. Upon termination of the rocket boost and jettisoning of the rocket nozzle and inlet and combustor port covers, air is admitted to the ramjet combustor, ramjet fuel flow is initiated and ignition of the fuel occurs. The control system schedules fuel flow immediately after ramjet light-off in open loop fashion to maintain a desired air inlet margin and properly position the shock wave at the inlet, the inlet margin control being a function of Mach number and angle of attack with an inlet air temperature bias. A maximum fuel-to-air schedule is also provided to obtain optimum operating conditions during acceleration. A closed loop vehicle Mach number control is provided where the Mach number limit is a function of altitude to limit speed to acceptable structural and/or aerodynamic heating characteristics. A minimum fuel-to-air ratio schedule is provided to prevent lean burner blowout during certain operating conditions, particularly during the dive portion of a trajectory. The fuel scheduling parameter is the ratio of fuel flow to combustion chamber pressure. Logic circuitry selects the desired control schedule, and fuel is modulated by a hydromechanical control in response to combustion chamber pressure. In place of combustion chamber pressure as a fuel scheduling parameter, there may be used air inlet pressure signal closely related to combustion chamber pressure or representative of inlet airflow.

DESCRIPTION OF THE PREFERRED EMBODIMENT

Figure 1:
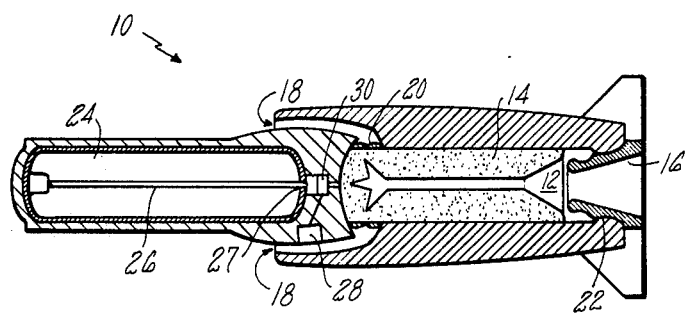
FIG. 1 is a schematic diagram of an integral rocket-ramjet vehicle.

Referring to FIG. 1 there is shown a representative integral rocket-ramjet vehicle 10 in schematic form. The precise vehicle structure will vary and numerous designs are possible, but the basic operation is similar. While FIG. 1 is a simplified schematic drawing, it shows the essential features of the vehicle. The rocket portion of the vehicle 10 includes a dual purpose combustion chamber 12 which contains solid rocket fuel 14 and a rocket nozzle 16 clamped to the back end of the combustion chamber. An air inlet 18 is blocked by a combustor port cover 20. Operation of rockets is well known and does not form a part of the invention. At the termination of rocket thrust, the booster nozzle 16 and its associated clamp, and the combustor port cover 20, are jettisoned. In some vehicles both an air inlet port cover and a combustor port cover are used. In either case, air is now fed through inlet 18 into combustion chamber 12 and ramjet operation is initiated. A ramjet nozzle is located as shown by reference numeral 22. Ramjet fuel is contained in chamber 24 at the front of the vehicle and fed via duct 26 into the combustion chamber 12 through injectors, not shown. A fuel control 28 for modulating the flow of ramjet fuel is connected to a valve 30 in the fuel supply duct 26. The valve 30 is opened in response to a signal that rocket boost is terminated, typically by a switch connected to the combustor cover which provides a signal indicating that it has been jettisoned, thereby admitting air to the combustion chamber. At the same time a signal is fed to a solenoid which initiates ramjet ignition. The above sequence of operation is well known and does not form a part of the present invention.

Figure 2:
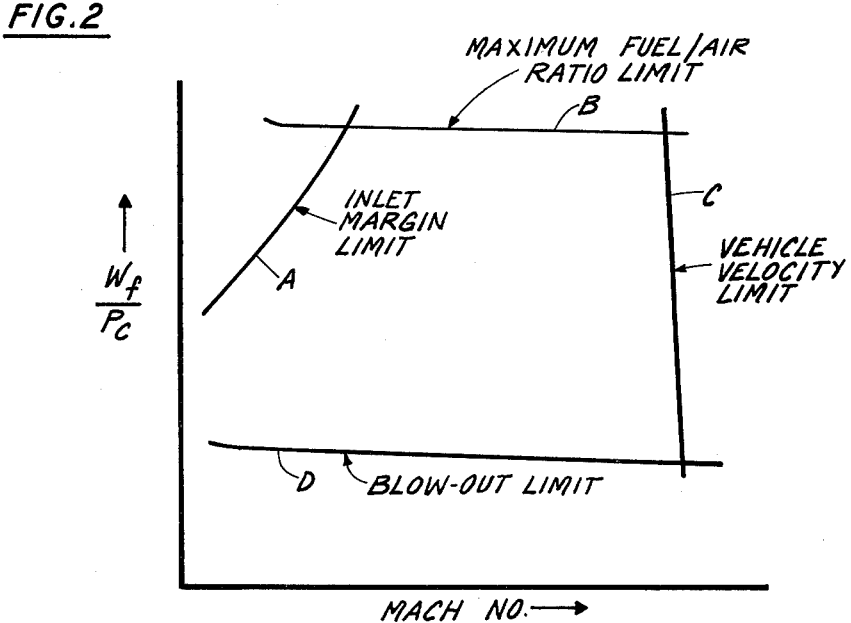
FIG. 2 is a graph showing the control limits for the ramjet fuel control as a function of Mach number versus the fuel scheduling parameter $W_f/P_c$.

FIG. 2 shows the control limits provided by the novel fuel control of this invention. The limits are shown in the form of a control limit map in which the limits are plotted as a function of vehicle Mach number versus a scheduling parameter $W_f/P_c$ where $W_f$ is fuel flow rate and $P_c$ is combustion chamber pressure, the ratio $W_f/P_c$ being an approximation of fuel-to-air ratio. The control limits consist of: air inlet margin limiting, line A; maximum fuel-to-air ratio limit, line B; vehicled maximum velocity or Mach number limit, line C; and minimum fuel-to-air ratio limmit, also referred to as blowout limit, line D. Ordinarily the air inlet margin limit is encountered immediately following transition from rocket to ramjet propulsion. Then as the vehicle accelerates to its cruise condition, the maximum fuel-to-air ratio limit is encountered until the vehicle Mach number or velocity limit is encountered, the latter limit generally being scheduled as a function of altitude. The Mach number limiting function is controlled in a closed loop manner, while the other functions are scheduled or open loop controls. The minimum fuel-to-air ratio or blowout limit is required to prevent lean burner blowout for dive conditions where the vehicle Mach number exceeds the limiting value and scheduled fuel flow is considerably reduced.

In integral rocket-ramjet applications, there is a need to make a rapid transition from the booster or rocket mode of operation to ramjet operation to minimize the Mach number loss during this unpowered portion of flight. The following sequence of events typically occurs in this transition region. A decay in booster thrust begins, known as booster tail-off, with a typical duration of about 0.1 seconds. Upon sensing of booster tail-off, the booster rocket nozzle, the inlet cover, if used, and then the combustor port cover are ejected. Airflow then exists through the booster case which is also used as the ramjet combustion chamber. The fuel control shut-off valve is opened near the end of booster tail-off and the ramjet fuel manifold, not shown, is rapidly filled to provide fuel flow through the injector nozzles into the ramjet combustion chamber as soon as possible after booster tail-off. The ramjet igniter is then energized, the turn-on time and time duration sequenced such that the igniter is operative when ramjet fuel flow starts through the injectors. Ramjet burner ignition occurs essentially as a step function, and since immediately after ignition additional energy sources such as igniter fuel, liner material, and insulating material can burn and provide a substantial rise in the temperature and pressure in the ramjet combustion chamber, resulting in a potentially dangerous reduction in inlet margin in prior art fuel controls, it is desirable to schedule a lower than normal fuel-to-air ratio during light-off of the ramjet phase to prevent inlet unstart immediately after ignition. This lower fuel-to-air ratio is designed to assure desired inlet operating conditions during light-off, and to maintain initial inlet margin. A scheduled, or open loop, inlet margin control assures safe light-off fuel flow until the additional sources of energy are consumed, and during the acceleration phase.

Figure 3:
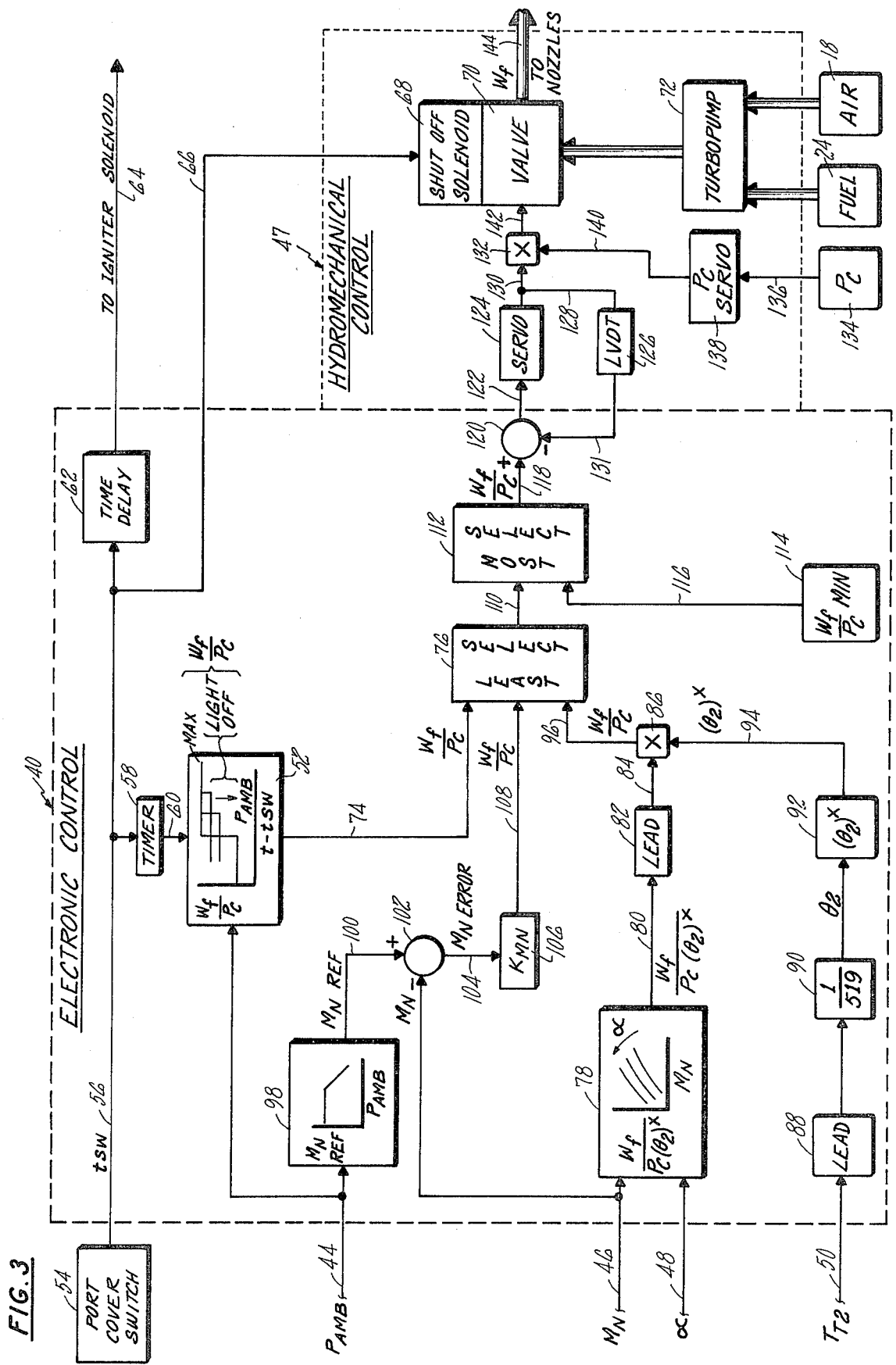
FIG. 3 is a schematic block diagram of the entire ramjet fuel control system.

Since an excess of ramjet fuel should not be in the combustion chamber during and immediately following ramjet light-off in order to prevent inlet unstart, the safest and preferred fuel control operation is to open the ramjet fuel shutoff valve when the combustor port cover is released. Referring to FIG. 3, there is shown the preferred implementation of the fuel control system. The fuel control is basically divided into two sections, an electronic control portion 40 and a hydromechanical control portion 42. Various operating parameters of the control such as selected vehicle and ambient conditions are also measured and signals indicative thereof fed to the fuel control system. The electronic control 40 will be assumed to be implemented in a digital manner, this being considered the best mode, but analog circuitry may also be used. The input signals to the electronic control 40, viz. ambient pressure, $P_{AMB}$, equivalent to altitude, on signal line 44; Mach number, $M_N$, on signal lie 46; vehicle angle of attack, $\alpha$, on signal line 48; and air inlet total temperature, $T_{T2}$, on signal line 50, may be provided by a well-known air data computer, or may be measured independently. A typical conical or wedge probe which senses nose pitot pressure and top and bottom static pressures can be used to provide Mach number, angle of attack and altitude information. Temperature sensors are well known and need not be described.

The light-off schedule and the maximum fuel-to-air ratio schedule are combined in block 52 of electronic control 40. A switch 54 is connected to the combustor port cover 20 of FIG. 1 and is actuated upon jettisoning of the port cover 20 at the beginning of booster rocket tail-off. The switch 54 produces a signal, $T_{sw}$, which appears on signal line 56, and is fed to a timer 58 to actuate the timer and produce a signal $t-t_{sw}$, where t is time, the signal $t-t_{sw}$ being fed to block 52 via signal line 60. The $t_{sw}$ signal on line 56 is also fed to a time delay circuit 62 and then fed via signal line 64 to the ramjet igniter solenoid, not shown, to initiate light-off of the ramjet. The $t_{sw}$ signal on line 56 is also fed via line 66 to the hydromechanical control 42 where it deactuates the shut-off solenoid 68 of a fuel flow valve 70 permitting flow of fuel therethrough as scheduled by the control system. Fuel from chamber 24 and a portion of the air bled from inlet 18 are fed to a pump 72, the pump feeding the fuel to valve 70. Pump 72 is typically a turbopump driven by the bleed air, and valve 70 is a metering valve and typically includes a throttle valve, shut-off valve and pressure regulating valve. The construction of the valving arrangement is well known to those skilled in the art and need not be described in detail.

Also fed to schedule block 52 is the $P_{AMB}$ signal on line 44. Schedule block 52 is bivariant in that it provides at its output a $W_f/P_c$ signal as a function of both the $t-t_{sw}$ signal on line 60, and as a function of $P_{AMB}$, so that the light-off value of $W_f/P_c$ and the time duration thereof are determined as a function of altitude, higher light-off values being provided at higher altitudes where inlet unstart is less of a problem. In essence, for a time after the inlet port cover is jettisoned, fuel flow is scheduled at a low light-off value, and after a time as determined by the schedule in block 52 is increased to a maximum value. The time delay in energizing the igniter provided by block 62 is for the purpose of permitting the fuel to fill the manifold between the fuel shut-off valve and fuel injectors before ignition. Thus the output signal from schedule block 52 on signal line 74 initially calls for a reduced fuel flow, the precised value being a function of altitude, $P_{AMB}$, and after a time determined as a function of altitude is increased to a maximum fuel flow. The output signal on line 74 is fed as one input to a least select circuit 76.

Immediately after ramjet ignition has occurred, it is desirable to modulate fuel flow to provide the maximum ramjet thrust available at the particular flight condition. In general, at low Mach numbers the maximum thrust is limited by the air inlet operating conditions. Some inlets may permit operations in the slightly sub-critical region, while other inlets may require only supercritical operation to avoid unsatisfactory or unstable inlet performance. The fuel control must operate so as to maintain the desired inlet operatiing condition over the complete range of vehicle Mach numbers and angles of attack. The point at which the inlet will actually operate is affected by inlet and ram burner performance characteristics, exhaust nozzle effective area, fuel heating value and fuel control metering accuracy, and the schedule must be determined empirically. For the open loop mode of control, fuel flow is scheduled to maintain desired inlet margin as shown in block 78 in which the parameter $$W_f/[P_c(\theta_2)^x]$$

is scheduled as a bivariant function of Mach number, $M_N$, on line 46 and vehicle angle of attack, $\alpha$, on line 48 where $(\theta_2)^x$ is a temperature bias which is inlet ram recovered temperature referred to standard day and raised to the exponent x. The scheduled function is fed via line 80 through a lead network 82 and then via line 84 to a multiplier 86. It is necessary to incorporate the temperature bias to minimize the errors resulting from variations in ambient air temperature. To compensate for the bias the air inlet total temperature, $T_{T2}$, on line 50 is fed through a lead network 88, a gain network 90 where the signal is divided by 519 to refer it to standard day conditions, $\theta_2$, and an exponential multiplier 92 to produce the signal $(\theta_2)^x$. The exponent should be approximately 0.75 to minimize the error. The signal $(\theta_2)^x$ is then fed via line 94 to multiplier 86 where it is multiplied by the inlet margin schedule signal $W_f/P_c(\theta_2)^x$ on line 84, resulting in an inlet margin schedule signal $W_f/P_c$ on line 96 which is also fed to least select circuit 76. Lead compensation is particularly useful in the inlet margin schedule for rapid angle-of-attack changes, and is easily included in an electronic control to minimize transient errors.

In order to prevent the vehicle from exceeding its structural and/or temperature limits, a maximum Mach number limit, or equivalent vehicle velocity limit is incorporated as a function of altitude pressure, $P_{AMB}$. The preferred implementation is shown in electronic control 40 where a Mach number reference signal $M_N$ REF, is produced in a scheduling block 98 as a function of pressure altitude $P_{AMB}$, on line 44. The $M_N$ REF signal is fed via signal line 100 to a comparator 102 where the $M_N$ REF signal is compared with actual Mach number $M_N$, on line 46. The comparator 102 is preferably a summing amplifier. The resulting signal, $M_N$ ERROR, on signal line 104 is fed through a gain network 106 where a gain $K_{MN}$ is applied to scale the signal appropriately and convert it into an equivalent fuel-to-air ratio signal, which is then fed via line 108 as an input to least select circuit 76.

Least select circuit 76 permits passage therethrough of the signal on whichever signal line 74, 96 or 108 call for the least fuel flow, i.e., schedules the lowest value of $W_f/P_c$. Typically, this will initially be the light-off signal on line 74, then the inlet margin signal on line 96, and then the maximum fuel-to-air limit signal on line 74 until the limiting Mach number is reached, in which case the limit signal on line 108 is selected.

The signal passed through least select circuit 76 is fed via signal line 110 to a most select circuit 112. Also fed to most select circuit 112 via signal line 116 is a minimum fuel-to-air ratio signal, $W_f/P_c$ MIN, produced in block 114. The value of $W_f/P_c$ MIN is derived from the performance characteristics of the ramject propulsion system to provide a minimum fuel-to-air limit. Since $W_f/P_c$ at a given fuel-to-air limit varies with flight conditions, the value selected is a compromise value which will preventd operating at a fuel-to-air ratio where ramjet combustion cannot be maintained. If required, this $W_f/P_c$ MIN setting can be biased with Mach number, angle of attack and air inlet temperature to provide a more accurate minimum fuel flow limit. This signal typically prevents lean burner blowout for dive conditions where the vehicle Mach number exceeds the desired limiting value. The signal on line 110 or line 116 calling for the largest value of $W_f/P_c$ passes through most select circuit 112 and via line 118 to a comparator 120. During normal operation the signal on line 118 will be the same signal which passed through the least select circuit 76, and will be the desired $W_f/P_c$ signal which will control the flow of fuel to the ramjet burner.

The output from comparators 120, which is an electrical error signal, is fed via signal line 122 to block 124 which contains a torque motor and a servo, converting the electronic signal on line 118 to a mechanical position on line 130. Position feedback around the servo 124 is produced by a linear variable displacement transducer (LVDT) 126 to which is fed, from line 130 via line 128, the mechanical position output from the servo 124. The LVDT 126 in turn converts the mechanical position signal to an electrical signal and feeds via line 131 to comparator 120. Since the torque motor and LVDT electrical signals are analog rather than digital, if the electronic control 40 is implemented in a digital manner, a digital-to-analog converter, not shown is required between most select circuit 112 and comparator 120. The output from comparator 120 is thus the difference between the desired $W_f/P_c$ signal on line 118 and the actual position of the servo 124, as indicated by LVDT 126.

The output from servo 124 is fed via line 130 to multiplier 132. Also fed to multiplier 132 is a signal indicative of combustor pressure, $P_c$, as measured by a sensor 134 and fed, via line 136, to $P_c$ servo 138, the output from which is a mechanical signal, and then via line 140 to multiplier 132. The multiplier 132, which is preferably a mechanical device, multiplies the $W_f/P_c$ mechanical signal on line 130 by the $P_c$ signals on line 140, producing on line 142 the desired fuel flow rate signal $W_f$ which is then fed to valve 70. The fuel metered by valve 70 is fed to the combustor nozzles via duct 144. The chamber pressure $P_c$ is measured just upstream of the fuel injectors. It is possible to use other pressures such as from the inlet compression ramp, cowl lip or diffuser for the reference pressure, but this would necessitate changes in the schedules in electronic control 40 as well as the control gains.

The digital control logic functions in electronic control 40 can be programmed into a simple, low cost microprocessor or can be included in a flight control computer. The control system is sufficiently flexible to assure desired performance with modifications in components and their performances.

While the invention has been described with respect to its best mode, it is apparent that modifications may be made thereto without departing from the scope of the invention as hereinafter claimed.

We claim:

1. In an integral rocket-ramjet vehicle having a combustion chamber, a source of ramjet fuel and an inlet supplying air to said combustion chamber, a fuel control for modulating the flow of fuel from said source to said combustion chamber upon termination of the rocket phase of vehicle operation, comprising:

means responsive to termination of the rocket phase of operation for producing a first signal indicative of desired fuel-to-air ratio upon ignition of said fuel in said combustion chamber, and indicative of a maximum fuel-to-air ratio after ignition of said fuel;

means responsive to selected vehicle operating conditions for producing a second signal indicative of a desired fuel-to-air ratio for limiting inlet operating pressures and thereby maintaining optimum performance of said inlet;

means for measuring vehicle velocity and producing therefrom a third signal indicative of desired fuel-to-air ratio to maintain vehicle velocity below a preselected limit;

least select means for receiving and selecting the one of said first, second and third signals which produces the lowest fuel-to-air ratio; and fuel scheduling means includingd valve means responsive to said selected fuel-to-air ratio signal for metering the desired amount of fuel from said source to said combustion chamber.

2. A fuel control as in claim 1 and further including:

means for scheduling a minimum fuel-to-air ratio for said vehicle;

most select means receiving the fuel-to-air ratio signal selected by said least select means and said minimum fuel-to-air ratio signal and selecting the signal which produces the highest fuel-to-air ratio;

and means for feeding the fuel-to-air ratio signal selected by said most select means to said fuel scheduling means.

3. A fuel control as in claim 1 including igniter means for initiating combustion of said fuel in said combustion chamber, and in which said means responsive to the termination of the rocket phase of operation includes:

means responsive to the admission of air from said inlet to said combustion chamber for producing an ignition signal;

a timing means;

means for producing a pressure signal indicative of the altitude of said vehicle;

means for initiating said timing means and producing a timing signal upon the occurrence of said ignition signal;

and scheduling means responsive to said timing signal and to said pressure signal for producing said first signal, said first signal scheduling a reduced fuel-to-air ratio with a magnitude and time duration as a function of said pressure signal and adapted to provide optimum fuel flow to said combustion chamber during the ignition phase, said first signal then increasing in magnitude to schedule a maximum fuel-to-air ratio.

4. A fuel control as in claim 3 and including time delay means, means for feeding said ignition signal to said time delay means whereby said ignition signal is delayed in time;

and means feeding said time delayed ignition signal to said igniter means.

5. A fuel control as in claim 4 and including a shut-off solenoid for said valve means whereby said valve means is closed during the rocket phase of operation;

and means for feeding said ignition signal to said shut-off solenoid to open said valve means upon occurence of said ignition signal.

6. A fuel control as in claim 1 in which said means for producing said second signals comprises:

means for producing a signal indicative of vehicle Mach number;

means for producing a signal indicative of vehicle angle of attack;

means responsive to said vehicle Mach number signal and said vehicle angle of attack signal for scheduling a fuel-to-air ratio signal optimally biased for inlet air temperature;

means for measuring the temperature of the air in said inlet and producing an inlet temperature signal indicative thereof; and means for multiplying said air inlet temperature biased fuel-to-air ratio signed by said inlet temperature signal.

7. A fuel control as in claim 1 in which said means for producing said third signal comprises:

means producingd a pressure signal indicative of the altitude of said vehicle;

means responsive to said pressure signal for scheduling a Mach number reference signal;

means for producing a signal indicative of actual vehicle Mach number;

means for comparing said Mach number reference signal with said actual vehicle Mach number signal to produce a Mach number error signal;

and gain means for converting said Mach number error signal into said third signal.

8. A fuel control as in claim 2 in which each of said fuel-to-air ratio signals is scheduled as the ratio of fuel flow to combustion chamber pressure;

means for measuring actual combustion chamber pressure and producing a signal indicative thereof;

means for multiplying said fuel-to-air ratio signal selected by said most select means by said actual combustion chamber pressure signal to produce a desired fluel flow signal; and means for feeding said desired fuel flow signal to said scheduling means to actuate said valve means in responsed thereto.

* * * * *